United States Patent
Tembey et al.

(10) Patent No.: US 12,506,789 B2
(45) Date of Patent: Dec. 23, 2025

(54) DISTRIBUTED CONTROL PLANE FOR AUTOMATED AND CUSTOMIZABLE CLOUD NATIVE RUNTIME APPLICATION SECURITY POLICIES

(71) Applicant: Operant AI, Inc., San Francisco, CA (US)

(72) Inventors: Priyanka Mohan Tembey, San Francisco, CA (US); Vrajesh Rajesh Bhavsar, San Francisco, CA (US); Ashley Michelle Chapman Roof, San Francisco, CA (US)

(73) Assignee: Operant AI, Inc., San Francisco, CA (US)

(*) Notice: Subject to any disclaimer, the term of this patent is extended or adjusted under 35 U.S.C. 154(b) by 17 days.

(21) Appl. No.: 18/626,630

(22) Filed: Apr. 4, 2024

(65) Prior Publication Data
US 2024/0348657 A1    Oct. 17, 2024

Related U.S. Application Data

(60) Provisional application No. 63/496,120, filed on Apr. 14, 2023.

(51) Int. Cl.
*H04L 9/40* (2022.01)
(52) U.S. Cl.
CPC .................. *H04L 63/20* (2013.01)
(58) Field of Classification Search
CPC ..................................... H04L 63/20
See application file for complete search history.

(56) References Cited

U.S. PATENT DOCUMENTS

| | | | |
|---|---|---|---|
| 11,240,205 B1* | 2/2022 | Ramesh | H04L 63/101 |
| 2013/0254360 A1 | 9/2013 | Anderson et al. | |
| 2017/0171246 A1 | 6/2017 | Arumugam et al. | |
| 2018/0234459 A1 | 8/2018 | Kung et al. | |
| 2019/0327271 A1* | 10/2019 | Saxena | H04L 41/16 |
| 2020/0151023 A1* | 5/2020 | Bai | H04L 41/5041 |
| 2023/0074868 A1* | 3/2023 | Herman | G06F 11/1458 |
| 2024/0113963 A1 | 4/2024 | Stivers et al. | |

FOREIGN PATENT DOCUMENTS

| | | |
|---|---|---|
| CN | 114553959 A | 5/2022 |
| CN | 114691050 A | 7/2022 |
| WO | 2017137803 A1 | 8/2017 |
| WO | 2023014940 A1 | 2/2023 |

OTHER PUBLICATIONS

Anonymous, "International Search Report and Written Opinion," PCT international application PCT/US2024/023012, Jul. 26, 2024, 12 pages, pub. by Korean Intellectual Property Office, Republic of Korea.

* cited by examiner

*Primary Examiner* — Noura Zoubair
(74) *Attorney, Agent, or Firm* — Baker Botts L.L.P.

(57) ABSTRACT

In various embodiments, a computer-implemented method, distributed systems architecture, and computer program product are programmed to enforce and update security policies for cloud-native application stacks deployed across multiple providers using a distributed control plane architecture.

15 Claims, 5 Drawing Sheets

DISTRIBUTED CONTROL PLANE FOR AUTOMATED AND CUSTOMIZABLE CLOUD NATIVE RUNTIME APPLICATION SECURITY POLICIES

BENEFIT CLAIM

This application claims the benefit under 35 U.S.C. 119(c) of provisional application 63/496,120, filed Apr. 14, 2023, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Operant AI, Inc.

TECHNICAL FIELD

One technical field of the present disclosure is computer-implemented network management methods, security engineering, and security management. Another technical field is cloud computing.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

Security engineering is the technical field of understanding networked resources and topologies, determining potential attack vectors, and hardening distributed systems against improper or unauthorized access. In the pre-cloud-native world, applications were deployed in private data centers and private networks, and the hardware/software infrastructure deployed to secure those applications was deployed within the same private networks alongside the applications. Examples include network-based firewalls and web application firewalls. Updates to the security infrastructure were performed manually every few months, as availability requirements and the frequency of firewall updates were relatively low. In particular, a manual operator would load the firewall hardware/software with an updated version of its firmware/software, reboot the firewalls, and configure the firewall rules to adapt to any new network changes that could impact application security.

Higher availability expectations exist for cloud-native applications; for example, only a few minutes of downtime may be allowed in a year. In addition, the application stack is vastly more complex with many more microservices, as well as more distributed and dynamic in terms of fast-evolving communication patterns like APIs between application services. To ensure the high availability of applications, the deployment, updates, and configuration of underlying security infrastructure that secures the applications need to be done in ways that reduce impact on the overall application availability.

The distributed and dynamic nature of modern cloud-native applications means that the number of possible vulnerabilities and attack vectors is constantly in flux compared with older applications deployed within controlled private data centers. This necessitates more frequent updates to security policies and rules that help defend applications from ever-evolving attacks. To reliably configure and update these policies constantly without harming application availability, manual approaches and one-off manual hotfixes can no longer work as they are prone to misconfigurations and lack of reliability, such as the inability to roll back to a safe operational state. There is a need for an automated way of updating security policies at scale with a codified and programmatic approach that enables reliable and performant operations.

Additionally, the point of policy enforcement, which is where security policies are enforced, needs to evolve as applications have evolved from monolithic to microservice-based application architectures. In the monolithic approach, applications were divided into static tiers of Web, Application, and Database and had predictable communication patterns between the tiers. East-west firewalls would secure the internal application traffic between these three tiers. However, as applications have been decoupled into more microservices, cast-west firewalls can pose performance issues as they add an additional layer through which application traffic has to be hairpinned, increasing the latency of processing requests. Scaling cast-west firewalls to growing application traffic poses a challenge as microservices scale and inter-service traffic increases. Decentralized security enforcement that is moved closer to the application itself is a more scalable security pattern for microservice-based application stacks. This approach has reliability benefits as updates, and their associated failure points can be restricted to a single microservice, as opposed to multiple applications that might rely on a centralized firewall entity. However, as security policy enforcement decentralizes, the updates to security policies also need to be decentralized while accounting for context and a greater level of detail, taking into account individual microservices and their specific security requirements. For example, the services and APIs that a microservice is allowed to talk to could be very different across different microservices. A fine-grained policy is different from coarser firewall rules, such as subnet-based or application tier-based security rules, in that it is more application-centric as opposed to network-centric.

Finally, today's computing environments may be heterogeneous, consisting of multi-cloud environments, multi-tenant environments, multiple clusters, and multiple namespaces. Microservices can be written in different languages and deployed across these heterogeneous environments while employing different API communication protocols such as HTTP, REST, GRPC, and Graphql. Therefore, the policies applied to each microservice should allow for customizations and extensibility to help express security policies specific to the microservice and its environment. Configuring and updating such customized security policies requires an understanding of the context of the application to be able to apply the correct policies. Due to this complexity, manually written custom code cannot reliably be used to configure and update these policies while meeting modern applications' availability needs. A need exists for programmatic and automated ways to introduce security policy customizations.

SUMMARY

The appended claims may serve as a summary of the invention.

DETAILED DESCRIPTION

Figure 1:
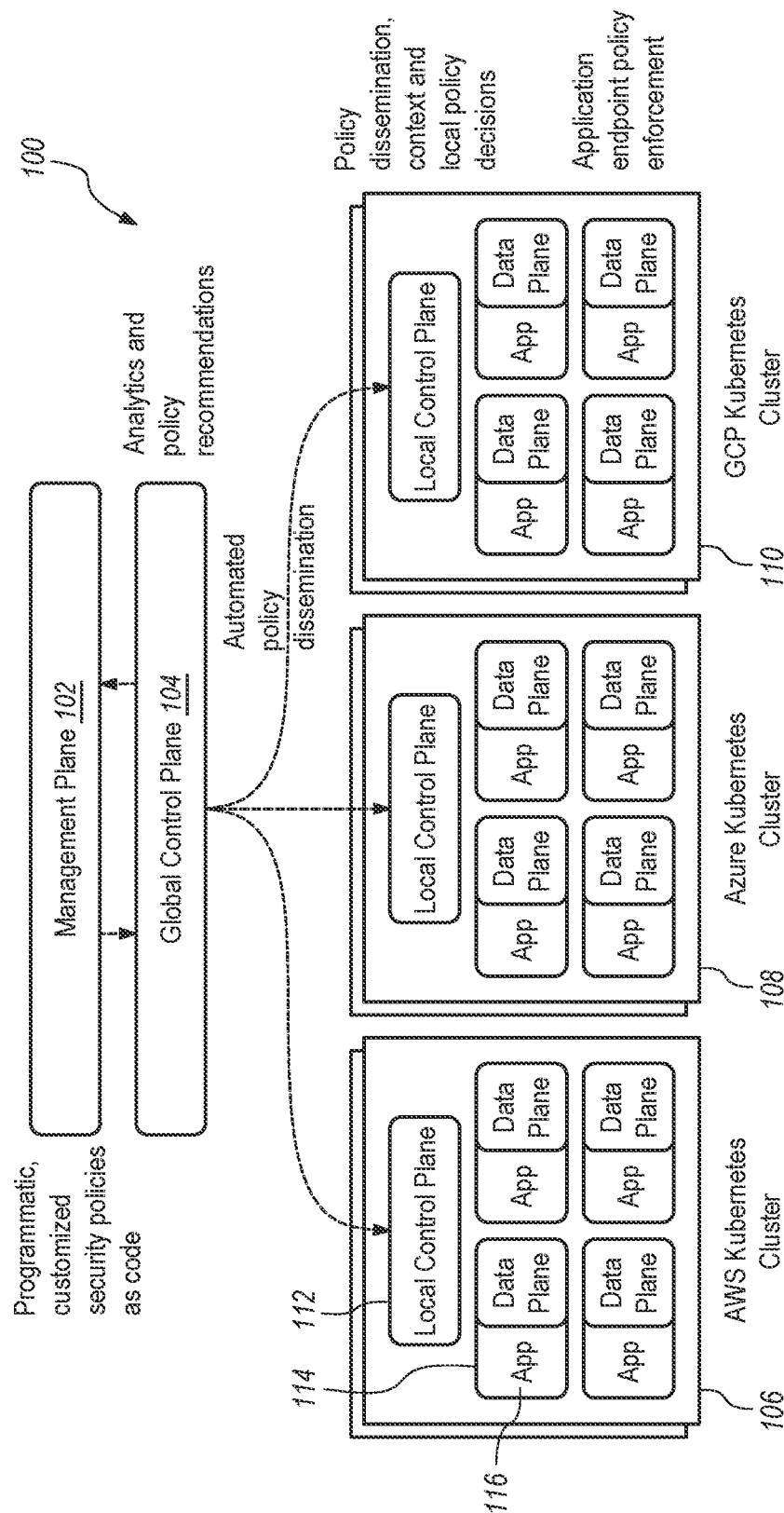
FIG. 1 illustrates a distributed computer system showing the context of use and principal functional elements with which one embodiment could be implemented.

In the following description, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

In the following description, the phrase "multiple distributed environments" is intended to represent any one or more multi-cloud environments, multi-tenant environments, multiple clusters, or multiple namespaces. In the following description, the phrase "multiple providers" is intended to represent one or more cloud providers or providers in other types of multiple distributed environments.

1. General Overview

In various embodiments, a computer-implemented method, distributed computer system, and computer program product are configured or programmed to enforce and update security policies for cloud-native application stacks deployed across multiple providers using a distributed control plane architecture. In this context, a control plane architecture is based on a management, control, and data plane architecture in which the control plane relays control signals (i.e., policies, configurations) to the data plane based on user inputs from the management plane or based on automatically discovered application-layer telemetry from the data plane. A control plane, as defined herein, comprises a plurality of sets of stored program instructions that are organized as services and/or microservices with logical connections, as further shown in other sections. Different control planes can be hosted or executed using a single computing device, multiple computing devices, and/or one or more virtual computing instances and virtual storage instances.

Embodiments are programmed to enforce and update security policies in ways that support the availability and reliability needs of cloud-native stacks. In one embodiment, a control plane is programmed to provide the following:

Distributed and decentralized policy updates: Embodiments are programmed to protect an organization's applications across multiple distributed environments using a distributed control plane architecture. In an embodiment, the distributed control plane enables a local point of control presence or local control plane within each distributed environment, and data planes are deployed as sidecar processes with each microservice application in the environment. Having such a distribution of control helps scale the overall control plane so that policies are created and disseminated to individual local control planes from a global control plane, and the local controllers are responsible for local policy decisions and policy dissemination to hundreds or thousands of data plane sidecars within the local environment. The distributed plane architecture for policy updates also helps create a more available control plane. In the event of availability issues with the global control plane, the local controllers can continue to be operational, which is critical in meeting the availability needs of today's cloud-native applications.

Programmatic and automated policy updates: Embodiments update security policies within multiple distributed environments in an automated manner. In this context, a security policy may include i) a policy schema that describes the structure and data types of the parameters within the policy, ii) the data/values populated as parameter values when the policy is applied, and iii) the code that is executed when a policy is applied and enforced. The local control plane and the data plane sidecars within which the policies are enforced may be pre-loaded with the policy schemas, data types, and policy execution code before a policy corresponding to the schema is applied. To do this, the distributed control plane pushes new policy schemas, data types, and code updates in an automated manner to the local control plane and data plane sidecars. The schema and code updates are bundled as new executable image updates and pushed to the local control and data planes. Once the control and data planes are updated with the policy capabilities, new security policies can be applied and enforced within application environments.

Reliable and performant runtime policy enforcement and updates: An important aspect of the separation between the data plane and the local control plane in the application environment is to allow separating the decision-making during policy enforcement from the enforcement itself, particularly in cases where making decisions is resource intensive. For example, authorizing requests based on client identification may involve checking the identity or role of the client against a list of permissions, followed by deciding if the identity or role is authorized to perform the request. As the permissions and roles in the application environment scale, and especially if multiple microservices need to perform authorization checks against the same permission rule set, separating out the rule set data and decision-making helps to keep the data plane lightweight in terms of memory and compute use. The local control plane takes over the tasks of rule storage and decision-making, while the data plane sidecar requests a decision from the local control plane and enforces it by allowing or denying the request.

The disclosed design also helps to keep the data plane stateless as it can always rely on reconfiguration from the local control plane during policy updates or restarts, and every state update in a stateful policy does not need to trigger a reconfiguration of the sidecar. This has significant advantages for the overall cost, performance, and scalability of the data plane footprint within an operating environment.

Customizable and fine-grained policy updates: In an embodiment, the local control plane automatically discovers features specific to applications, such as the network protocols they communicate with. Examples of discoverable protocols include HTTP, gRPC, and database protocols such as Mysql. Discovery of such protocols is based on the request and packet data and headers that the data plane sidecars detect in the data path. In response to detecting the data, embodiments are programmed to determine contextual policies to be applied specific to the microservice. As the point of enforcement is at each individual microservice, as opposed to a central firewall entity, these application-specific policies can be very contextual, fine-grained, and specific to the microservice. In an embodiment, the global control plane can publish specific contextual policy updates to individual data plane sidecars based on automatic protocol discovery without overloading all policy updates across all the data plane sidecars, thereby preserving the lightweight nature of the sidecars in terms of their resource requirements.

Various embodiments encompass the subject matter of the following numbered clauses:

1. A computer system comprising: a first computing cluster executing a first plurality of software containers, each software container of the first plurality of software containers hosting a different first application program and a first data plane operating as a first sidecar process in relation to the corresponding different first application program, each of the first computing clusters also executing a first local control plane that is programmatically coupled to the first data plane in each software container of the first plurality of software containers; a second computing cluster executing a second plurality of software containers, each software container of the second plurality of software containers hosting a different second application program and a second data plane operating as a second sidecar process in relation to the corresponding different second application program, each of the second computing clusters also executing a second local control plane that is programmatically coupled to the second data plane in each software container of the second plurality of software containers; a global control plane that is programmatically coupled with the first local control plane and the second local control plane; one or more non-transitory computer-readable storage media storing one or more sequences of instructions which, when executed using one or more processors of the first computing cluster, the second computing cluster, and the global control plane, cause the one or more processors to execute: initiating execution of the global control plane, the first local control plane, and the second local control plane; receiving, using the global control plane, input data specifying a new or updated policy; transmitting policy data corresponding to the new or updated policy from the global control plane to the first local control plane and the second local control plane; at the first local control plane, transforming the policy data into local filters or instructions for the first sidecar process; receiving, at the first local control plane, from the first sidecar process, a request associated with a particular first application program; executing a decision to allow or deny the request and transmitting the local instructions to the particular sidecar process; and executing the local instructions using the first sidecar process to enforce the security policy against the particular first application program.

2. The computer system of claim 1, wherein each software container of the first plurality of software containers hosts a different first microservice, and each software container of the second plurality of software containers hosts a different second microservice.

3. The computer system of claim 1, wherein each of the first computing cluster and the second computing cluster is any of an AWS KUBERNETES cluster, an AZURE KUBERNETES cluster, and a GCP KUBERNETES cluster.

4. The computer system of claim 1, further comprising instructions which, when executed using the one or more processors of the first computing cluster, the second computing cluster, and the global control plane, cause the one or more processors to execute transmitting the policy data corresponding to the new or updated policy from the global control plane to the first local control plane and the second local control plane without a restart of the first sidecar process or the second sidecar process.

5. The computer system of claim 1, further comprising instructions which, when executed using the one or more processors of the first computing cluster, the second computing cluster, and the global control plane, cause the one or more processors to execute: discovering, at the particular local control plane, an activation of a new discoverable protocol in use by a particular microservice application; determining, at the particular local control plane, a context-specific modification to the policy based on the new discoverable protocol; and executing the context-specific modification to the policy using the particular sidecar process in association with the particular microservice application.

6. The method of claim 1, further comprising receiving, at the global control plane, one or more security policies from a management plane; receiving, at the global control plane, application-layer telemetry data from a plurality of the local control planes; comparing the local telemetry data to existing security policies and the security policies received from the management plane; identifying one or more security gaps based on the comparison; and automatically publishing updated security policies to one or more of the local control planes based on the identified security gaps.

7. A computer-implemented method of executing a global control of a cloud-native application stack in a distributed computer system, the method comprising: in a first computing cluster executing a first plurality of software containers, each software container of the first plurality of software containers hosting a different first application program, initiating execution of a first data plane operating as a first sidecar process in relation to the corresponding different first application program, each of the first computing clusters also executing a first local control plane that is programmatically coupled to the first data plane in each software container of the first plurality of software containers; in a second computing cluster executing a second plurality of software containers, each software container of the second plurality of software containers hosting a different second application program, initiating execution of a second data plane operating as a second sidecar process in relation to the corresponding different second application program, each of the second computing clusters also executing a second local control plane that is programmatically coupled to the second data plane in each software container of the second plurality of software containers; initiating execution of a global control plane that is programmatically coupled with the first local control plane and the second local control plane; receiving, using the global control plane, input data specifying a new or updated policy; transmitting policy data corresponding to the new or updated policy from the global control plane to the first local control plane and the second local control plane; at the first local control plane, transforming the policy data into local filters or instructions for the first sidecar process; receiving, at the first local control plane, from the first sidecar process, a request associated with a particular first application program; executing a decision to allow or deny the request and transmitting the local instructions to the particular sidecar process; and executing the local instructions using the first sidecar process to enforce the security policy against the particular first application program.

8. The computer-implemented method of claim 7, wherein each software container of the first plurality of software containers hosts a different first microservice, and each software container of the second plurality of software containers hosts a different second microservice.

9. The computer-implemented method of claim 7, wherein each of the first computing cluster and the second computing cluster is any of an AWS KUBERNETES cluster, an AZURE KUBERNETES cluster, and a GCP KUBERNETES cluster.

10. The computer-implemented method of claim 7 further comprising transmitting the policy data corresponding to the new or updated policy from the global control plane to the first local control plane and the second local control plane without a restart of the first sidecar process or the second sidecar process.

11. The computer-implemented method of claim 7, further comprising discovering, at the particular local control plane, an activation of a new discoverable protocol in use by a particular microservice application; determining, at the particular local control plane, a context-specific modification to the policy based on the new discoverable protocol; and executing the context-specific modification to the policy using the particular sidecar process in association with the particular microservice application.

12. The computer-implemented method of claim 7, further comprising receiving, at the global control plane, one or more security policies from a management plane; receiving, at the global control plane, application-layer telemetry data from a plurality of the local control planes; comparing the local telemetry data to existing security policies and the security policies received from the management plane; identifying one or more security gaps based on the comparison; and automatically publishing updated security policies to one or more of the local control planes based on the identified security gaps.

13. A computer-implemented method of enforcing and updating security policies using a distributed control plane architecture, the method comprising receiving input data specifying a new or updated policy at a global control plane coupled with multiple local control planes, each local control plane operating within a different control plane containerized cluster in a computing environment with distributed systems corresponding to multiple applications in a cloud-native application stack; transmitting policy data corresponding to the new or updated policy from the global control plane to each local control plane; transforming, at a particular local control plane, the policy data into local filters or instructions for a particular sidecar process associated with a microservice application, the sidecar process functioning as a data plane; receiving, at the particular local control plane, a request from the sidecar process; making a decision to allow or deny the request and transmitting local instructions to the sidecar process; executing, at the sidecar process, the local instructions to enforce the security policy for the cloud-native application stack; discovering, at the particular local control plane, an activation of a new discoverable protocol used by the microservice; determining, at the particular local control plane, a context-specific modification to the policy based on the new discoverable protocol; executing, at the sidecar process, the context-specific modification to the policy in association with the microservice; receiving, at the global control plane, one or more security policies from a management plane; receiving, at the global control plane, application-layer telemetry data from a plurality of local control planes; comparing, at the global control plane, the local telemetry data to the existing security policies and those received from the management plane; identifying, at the global control plane, security gaps based on the comparison; and automatically publishing, from the global control plane, updated security policies to one or more local control planes based on the identified security gaps.

2. Structural & Functional Overview 2.1 Distributed Computer System Example

FIG. 1 illustrates a distributed computer system showing the context of use and principal functional elements with which one embodiment could be implemented. A computer system of an embodiment of FIG. 1 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of multi-layer security engineering for cloud-native applications. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, the system of FIG. 1 comprises a management plane 102 that is programmed to transmit programmatic, customized security policies as code to a global control plane 104 and to receive analytics and policy recommendations from the global control plane. The global control plane 104 is programmed to execute automated policy dissemination to a plurality of local control planes 112, each of which can execute in a different containerized cluster 106, 108, 110 of a virtual computing environment 105. To illustrate a clear example, FIG. 1 shows the global control plane 104 in communication with three local control planes 112 that are respectively hosted in an AWS Kubernetes cluster 106, an Azure Kubernetes cluster 108, and a Google Cloud Kubernetes cluster 110. Other embodiments can use more or fewer local control planes 112 and different virtual computing environments; thus, the specific configuration of FIG. 1 is not required.

Each cluster 106, 108, 110 in a virtual computing environment 105 includes both the local control plane 112 and a plurality of applications 116, each of which is instrumented with, linked to, or capable of programmatically calling or being called from a data plane 118. The local control plane 112 is programmed to execute policy dissemination, transmit and receive context data, and perform local policy decisions. Each data plane 118 is programmed to execute application endpoint policy enforcement.

In an embodiment, the elements of FIG. 1 can be configured and programmed to implement the foregoing functions as detailed in the following sections.

Data Plane: Each data plane 118 comprises a set of filters and extensions or modules that process and act on incoming and outgoing application data. The filters are programmed to look at request parameters such as request headers, including but not limited to authorization headers, user-agent headers, cookies, and the data within request payloads, and subsequently apply security policies on the requests that perform various actions on the requests. Example actions include denying a request based on values in an authorization header or rate-limiting a request based on a client address. A security policy applied within a network filter is a combination of a complex data type that defines certain parameters for inspection within application requests, values of those parameters that are matched against the policy, and actions to be taken or code to be executed in case a match is detected such as accepting or denying or rate-limiting a request.

Figure 5:
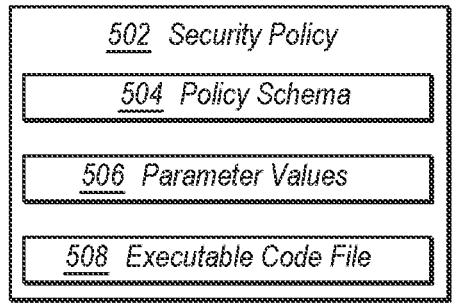
FIG. 5 illustrates a data structure of an example security policy.

FIG. 5 illustrates a data structure of an example security policy. In an embodiment, a security policy 502 comprises a digitally stored association of a policy schema 504, parameter values 506, and an executable code file 508. The policy schema 504 can be within the policy or comprise a reference to an external schema and defines the names and data types of allowed attributes in a policy. The parameter values 506 comprises a set of specific values for the attributes. The executable code file 508 comprises code that a local control plane 112 can execute to apply the policy to requests of an application 116 to which the policy applies.

TABLE 1 presents an example of code that can be used for such a policy:

TABLE 1

MICRO-SEGREGATION POLICY SCHEMA THAT ALLOWS/DENIES COMMUNICATION BETWEEN TWO MICROSERVICE ENTITIES

```
{
  "$schema": "http://json-schema.org/draft-07/schema#",
  "$id": "https://core.operant.ai/service-to-service-segment.schema.json",
    "title": "Service to Service Segmentation Configuration",
    "description": "Add Service and Namespace level segmentation for your apps",
    "type": "object",
    "properties": {
      "action": {
        "type": "string",
        "description": "Authorization action: allowed values: allow, deny, external"
      },
      "externalPdP": {
        "type": "string",
        "description": "Policy Decision Endpoint: allowed values: valid local control plane service uri"
      },
      "upstream-services": {
        "type": "string",
        "description": "Comma separated services that the target service is allowed or denied access to"
      },
      "namespaces": {
        "type": "string",
        "description": "Comma separated namespaces that the target service is allowed or denied access to"
      }
    },
    "additionalProperties": false
}
```

In the example of Table 1 and Table 2, references to "operant" merely provide one convenient label or name for a service that can implement the API, and other embodiments can use other labels or names to implement functionally equivalent programming and/or functional elements.

The action to be applied to a request in case there is a match in the parameter values of a request between the policy parameters or values 506 of the policy schema 504 and the request data is termed policy decision and policy enforcement. Policy decisions may be encoded within the network filter for simple policies or offloaded to a policy decision service within the local control plane in the case of data and/or compute-intensive policy decisions. Based on the policy decision, the network filter will proceed to enforce the corresponding action, such as accepting or denying the request.

Local Control Plane: The local control plane 112 comprises a controller process that connects to the global control plane 104 and each data plane 118, sending application telemetry discovered from applications 116 or requests via the data planes to the global control plane and downloading command and control and/or policy updates from the global control plane and disseminating to the local data plane. The application context and telemetry data from applications 116 are used by the global control plane 104 to determine the right fine-grained security policies to apply contextually across the microservices that applications 116 implement, terminate, or represent.

In a Kubernetes implementation, as for the AWS Kubernetes cluster 106, the local control plane 112 is a programmatic virtual container deployed within a Kubernetes namespace. As part of policy schema updates received from the global control plane 104, the local control plane 112 could expand its capabilities by downloading additional container images from the global control plane for additional policy decision processing or environment-specific control capabilities. An example could be downloading an AWS-specific, Azure-specific, or GCP-specific controller container image to enable security policies for these specific cloud provider stacks. As a second example, additional container images are downloaded for policy decision processing when the security policy involves authorizing application requests against a set of role-based permissions. For such an authorization policy, an authorization decision processor container is downloaded, which will perform the policy decisions during policy enforcement time. These processes are further described in other sections relating to FIG. 2.

Global Control Plane: The global control plane 104, which may be a SaaS control plane, interfaces with a management plane 102 through which users can apply security policies 502 across their application environments 105. The global control plane 104 also interfaces with all the local control planes 112 deployed within remote application environments 105 distributed across distributed provider stacks and automates policy updates across them. Beyond user-defined policies, the global control plane 104 continuously processes incoming application layer telemetry from the local control plane 112, checks current behavior against security best practices or compliance best practices, and recommends security policies to users through the management plane 102. Based either on user input or automatically, the global control plane 104 publishes these recommended policies to the relevant local control planes 112 for enforcement within the data plane using data planes 118, taking into account the application context in which the security policy 502 should be applied.

2.2 Example Data Processing Flows

Figure 2:
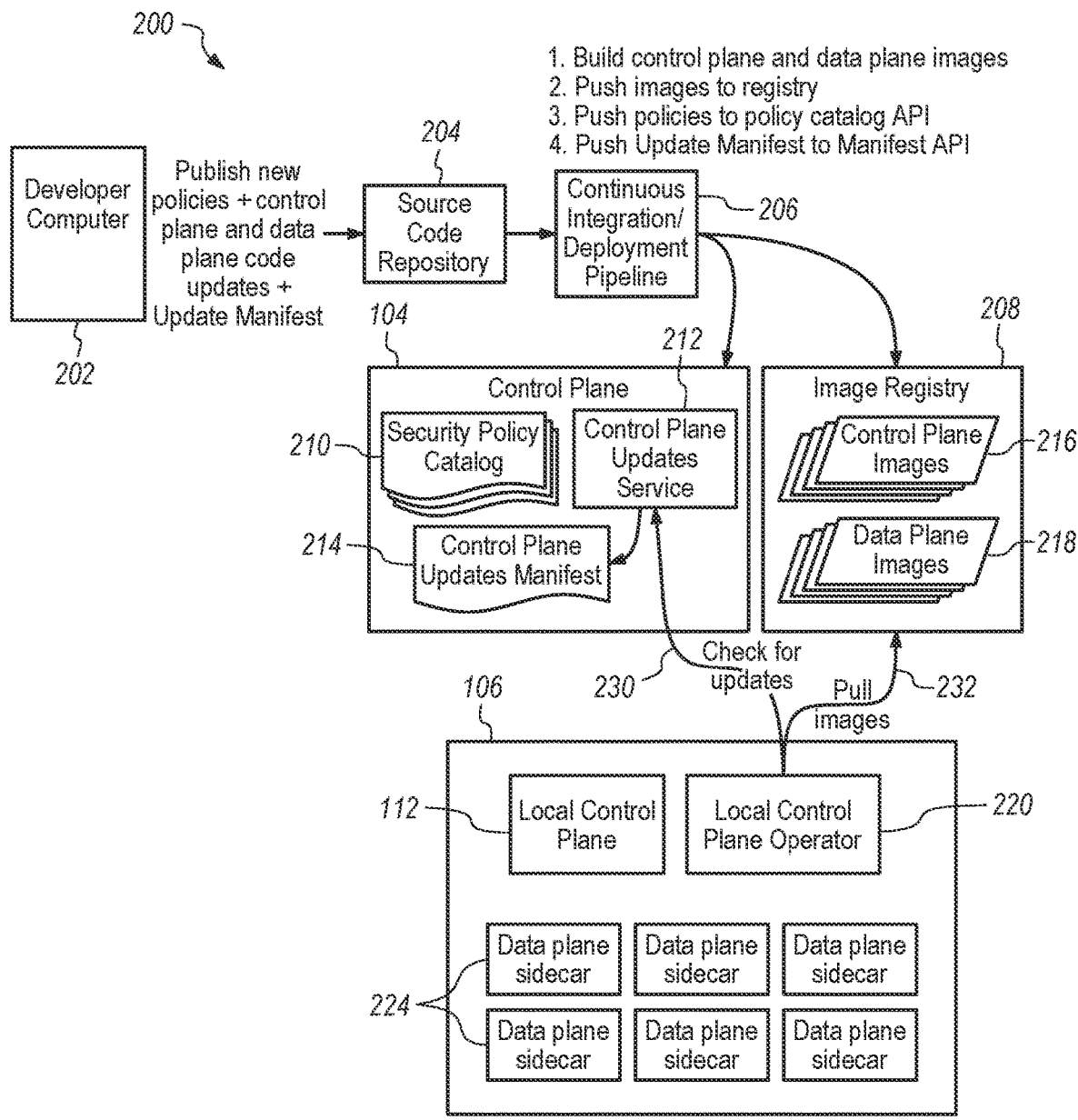
FIG. 2 illustrates an example of data flow and processing steps to disseminate policy updates to distributed data planes.

FIG. 2 illustrates a data flow and processing steps to disseminate policy updates to the distributed data planes (also referred to herein as "data plane sidecars" 224) from the global control plane (referred to below as "SaaS control plane") in a programmatic and automated manner using an embodiment. FIG. 2 is intended as an illustration of the functional level at which skilled persons in the art to which this disclosure pertains communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, developer computers 202 are coupled to or have networked access to a source code repository 204. A continuous integration and deployment pipeline 206 is communicatively coupled to the source code repository 204 and to a SaaS control plane 207 and image registry 208. The SaaS control plane 207 stores a security policy catalog 210, and a control plane updates manifest 214 and hosts or executes a control plane update service 212. The image registry 208 hosts or stores a plurality of control plane images 216 and data plane images 218. The local control plane 112 can comprise a local control plane operator 220 that is programmed to check or poll the control plane update service 212 of the SaaS control plane 207 for updates, as arrow 230 shows, and to pull control plane images 216 and/or data plane images 218 from the image registry 208 when an update is detected, as arrow 232 shows. The local control plane operator 220 and the local control plane 112 are communicatively coupled to the data plane sidecars 224 to facilitate the distribution of images to the data plane.

In an embodiment, the developers and/or developer computers 202 can create, store, and publish new security policies 502 comprising the new policy schemas 504, executable code file 508 embodying actions in the form of control plane and data plane code updates, and the control plane updates manifest 214 specifying the nature of the updates. Policies, code, and manifests can be created and stored in a source code repository 204, asynchronously with respect to other operations of FIG. 2. At any point thereafter, continuous integration and deployment pipelines 206 can be programmed to build control plane and data plane images 216, 218, push the images to an image registry 208, push policies to the security policy catalog 210 via a policy catalog API, and push the update manifest to the control plane updates manifest 214 via a manifest API. The continuous integration and deployment pipelines 206 can be scripted to execute whenever a new policy type is added to the security policy catalog 210 of the SaaS control plane 207. For example, a policy type added to the security policy catalog 210 could enable service-to-service micro-segmentation, a policy 502 that will allow/deny communication between two services in the application environment, like the policy of Table 1. The capability to enable this micro-segmentation policy within the application environment 105 is present in the local control plane 112 and the data plane sidecars 224. A control planes updates manifest 214 is published as well, which includes the latest control plane image 216 version, the data plane image 218 version for the data plane sidecars 224 that has the capability present within it, or a newer data plane container version that would update the data plane as well to enable the new policy 502.

In a container implementation, the new control plane images 216 and data plane images 218 are published as container images to a container registry. The new container images may be progressively versioned. In an embodiment, the local control plane operator 220 includes a separate operator container process responsible for updating control plane 112 and the data plane sidecars 224. The operator container process periodically checks for newer versions of the control planes updates manifest 214. If the control planes updates manifest 214 is updated, the local control plane operator 220 downloads a new container image if the version and image hash are higher and different from the local image for the local control plane 112 and data plane sidecars 224. The updated container image ensures that the local control plane 112 and data plane sidecars 224 can implement the latest security policies 502 defined within the SaaS control plane 207 by decoding their policy schemas 504 and enforcing them within the data plane. In an embodiment, such as in a Kubernetes implementation, the containers for the data plane sidecars 224 and a container for the local control plane 112 are restarted after updating with the latest container images.

Once the policy schemas 504 and data types are updated within the local control plane and data plane, the new security policy 502 may be applied in any of the following ways.

1. In an embodiment, the SaaS control plane 207 dynamically discovers security gaps and recommends security policies to fix them continually, followed by fixing the gaps within the environments using distributed policy updates and enforcement. For example, as the local control plane 112 starts operating in application environment 105, the local control plane automatically discovers and registers context data with the SaaS control plane 207. Application context data can include information about the application environment, such as Kubernetes cluster-ID, namespace, cloud provider type, region, and zone. The local control plane 112 also discovers and registers data identifying the microservices and APIs in the application environment 105, such as applications 116 in cluster 106 in the case of FIG. 2.

Other aspects of application telemetry that can be communicated from applications 116 of cluster 106 to the local control plane 112 include security gaps detected within the application and its environment. Security gaps could be the lack of appropriate authentication or authorization mechanisms in place for microservice APIs. In an embodiment, the SaaS control plane 207 uses this contextual information and compares it against security best practices, such as the need to have appropriate API authentication techniques or end-to-end encryption between microservices in place. Security best practices are a collection of defined security policies within the policy library in the management plane 102. In an embodiment, the SaaS control plane 207 either recommends or automatically plugs security gaps by taking action by applying security policies to the relevant microservices.

2. In another embodiment, security teams tasked with securing application environments apply security policies actively within environment 105 as guardrails that enforce the security requirements for applications 116. A collection of such guardrail policies may be provided via a policy library in the management plane 102, which users select and apply to specific microservices in their stack. An example policy is a micro-segmentation policy applied by a security team based on the policy schema defined in Table 1, which denies application traffic from the frontend microservice to any service in the "dev" namespace in one of their clusters 106, 108, 110. The policy schema may already be distributed to the local control plane 112 and data planes 118 before this policy is applied.

Figure 6:
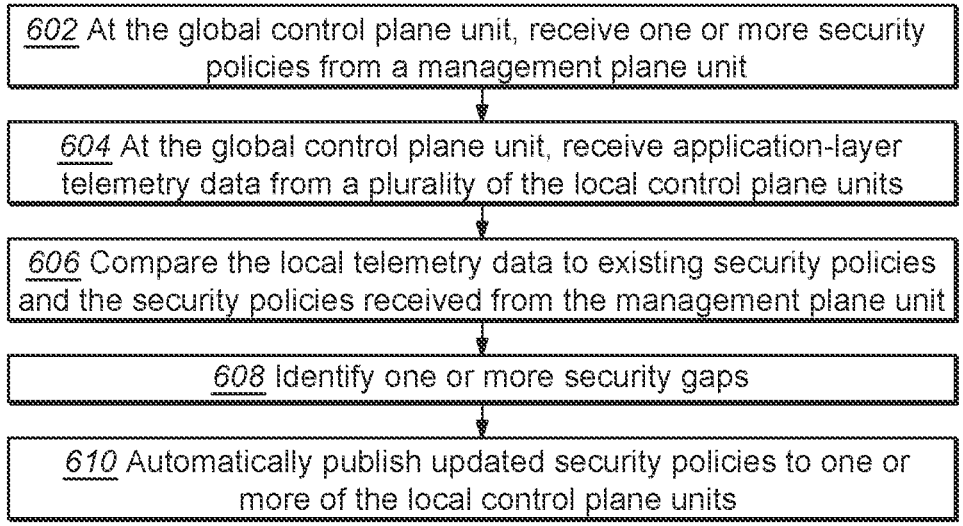
FIG. 6 is a flow diagram of a logical process flow that can be programmed for one embodiment.

3. FIG. 6, which is described in other sections herein, represents the functional steps that can be programmed in an embodiment to implement the specific sub-steps of the preceding sections.

Embodiments also provide customizable and fine-grained policy updates. For example, in an embodiment, the local control plane 112 discovers the application environment features automatically, such as the cloud provider that the microservice container is installed in or the presence of specific database types like MySQL and the microservices that connect to it. Beyond these deployment and connection features, the local control plane 112 may discover runtime security gaps automatically for specific microservices, such as the absence of authorization tokens or the absence of rate limits for high request throughput microservices.

In an embodiment, the local control plane 112 sends this context and application telemetry to the SaaS control plane 207, which then recommends appropriate security controls and guardrails to be applied to the relevant microservices and their communication paths. For microservice deployments in cloud provider stacks, the SaaS control plane 207 might recommend security policies specific to the cloud provider. These policies, including their schemas, code, and data types, are packaged as a container image specific to the cloud provider stack. Examples of images include an AWS policy image or an Azure policy image. The local control plane operator 220 in the application environment is programmed to download the correct image based on the container name and version conveyed in the policy update manifest, as shown by arrow 232.

For other controls, such as when rate limits need to be added to specific microservices to safeguard against denial-of-service attacks, both the data plane sidecar 224 and the local control plane 112 may be updated with additional customized network filters that can rate-limit the requests in the data plane while relying on state maintained in the local control plane for request rate accounting and limiting. In this case, the update manifest includes details about other container images that should be downloaded within the local control plane 112 to enable rate-limiting functionality and specific data plane configurations so that the rate limits can be enforced at runtime. TABLE 2 presents an example of code that can be used for this update manifest:

TABLE 2

UPDATE MANIFEST FOR UPDATING LOCAL
CONTROL PLANE AND DATA PLANES

```
{
  "version": 2,
  "controlPlaneVersion": "v0.1.0",
  "controlPlaneHash": "0123acbvfjgsj",
  "dataPlane": {
       "Version": "v0.2.0",
       "dataPlaneHash": "0bndgfjks112hgdh"
  }
  "Capabilities": [
     {
        "Capability": "Rate-Limits",
        "Containers": [
           {
             "Name": "operant.ecr/rate-limit",
             "Version": "v0.1",
             "Ports": 9090,
           }
        ]
     },
     {
        "Capability": "Authz",
        "Containers": [
           {
             "Name": "operant.ecr/authz",
             "Version": "v0.1",
             "Ports": 9091,
           }
        ]
     },
  ]
}
```

Being able to download and enable such piecemeal capabilities over time within application environments helps in keeping the data plane and local control plane 112 as lightweight as possible in terms of CPU and memory requirements, as well as prone to fewer security holes as the code footprint of the introduced components remains as small as possible.

Figure 4A:
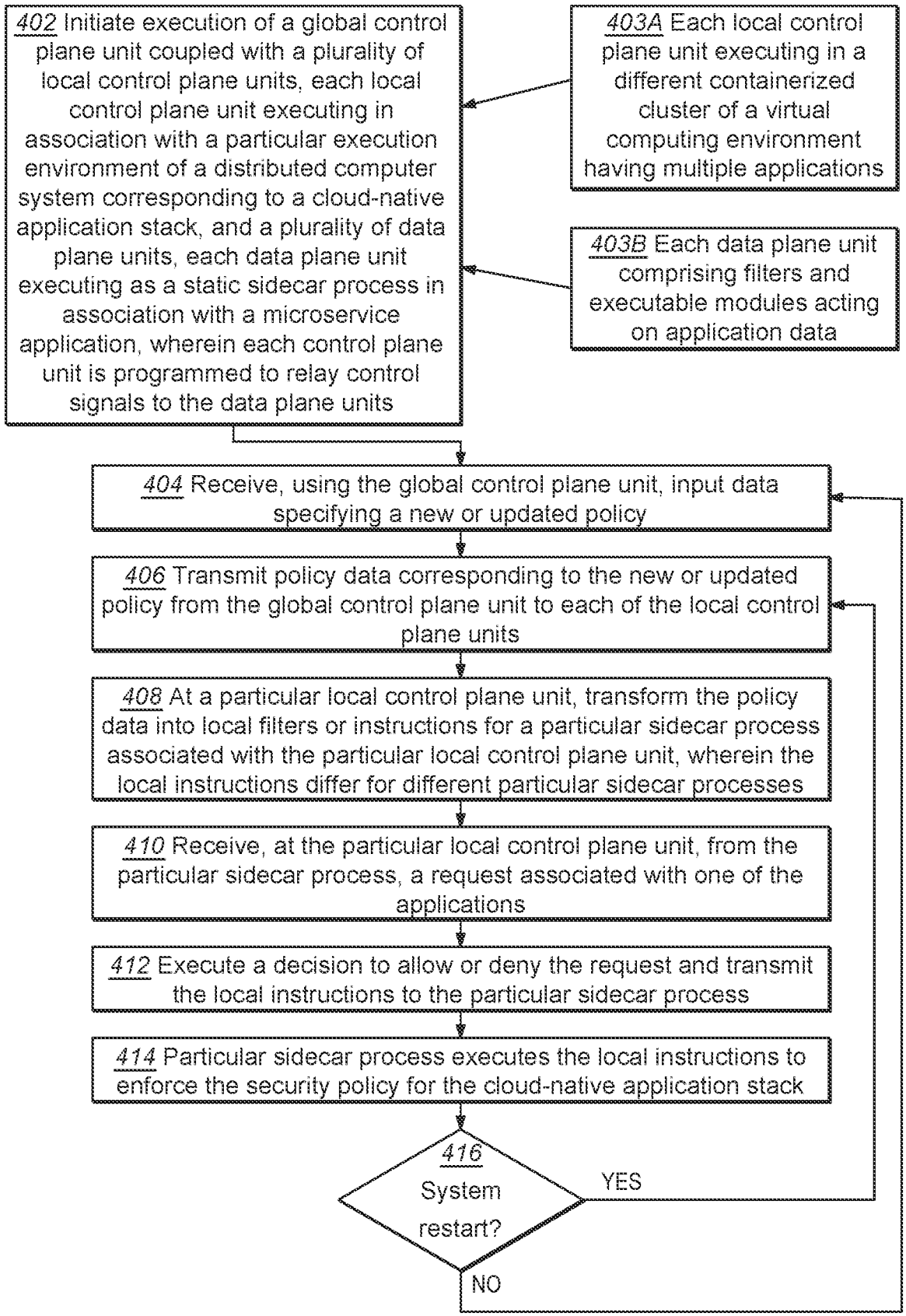
FIG. 4A and FIG. 4B are flow diagrams of a logical process flow that can be programmed for one embodiment.
Figure 4B:
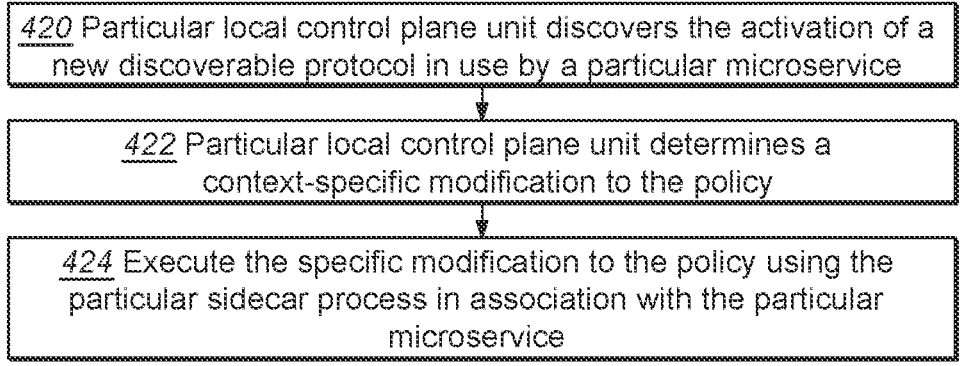

FIG. 4A and FIG. 4B are flow diagrams of a logical process flow that can be programmed for one embodiment.

Referring first to FIG. 4A, in an embodiment, the process begins at block 402 by initiating the execution of a global control plane coupled with a plurality of local control planes, each local control plane executing in association with a particular execution environment of a distributed computer system corresponding to a cloud-native application stack, and a plurality of data planes, each data plane executing as a static sidecar process in association with a microservice application, wherein each control plane is programmed to relay control signals to the data planes. Block 402 can include preparatory sub-steps as appropriate for the execution environment, such as instantiating containers and/or virtual computing instances and downloading and installing programs, libraries, modules, or other software elements that are programmed to implement the other functions that are further described herein for the global control plane and local control planes. Block 402 also can be viewed, for some embodiments, as representing the configuration or programming steps necessary to establish an operational global control plane, local control planes, and data planes consistent with the architecture of FIG. 1 or FIG. 2.

In some embodiments, as shown in block 403A, each local control plane executes in a different containerized cluster of a virtual computing environment having multiple applications. In some embodiments, as shown in block 403B, each data plane comprises filters and executable modules acting on application data.

At block 404, the process is programmed to receive, using the global control plane, input data specifying a new or updated policy. For example, the management plane 102 (FIG. 1) can be programmed to display a graphical user interface having a plurality of widgets that are programmed to receive input from a personal computer to program or customize security policies and store them in persistent storage of the management plane. The management plane 102 can be programmed to receive telemetry data from the global control plane 104 for analytics purposes and to transmit recommendations of policies to use based on the analytics back to the global control plane. In this manner, the global control plane periodically receives input data specifying a new or updated policy, either directly from the management plane 102 or indirectly from a user computer interacting with the management plane. Block 404 can incorporate wait state instructions by which the process executes without advancing to other blocks until input data is received specifying a new or updated policy. A policy schema like TABLE 1 could be received.

At block 406, the process is programmed to transmit policy data corresponding to the new or updated policy from the global control plane to each of the local control planes. As shown in FIG. 1, the global control plane 104 can be programmed for automated policy dissemination to local control plane 112 in each of a plurality of clusters 106, 108, 110. The transmission can include instructions like TABLE 2.

At block 408, the process is programmed at a particular local control plane to transform the policy data into local filters or instructions for a particular sidecar process associated with the particular local control plane, wherein the local instructions differ for different particular sidecar processes. Block 408 can include transforming instructions like TABLE 2 into port-based filters that a particular data plane sidecar 224 can enforce against a particular application 116 or its requests.

At block 410, the process is programmed to receive, at the particular local control plane, a request associated with one of the applications from the particular sidecar process. For example, a local control plane 112 can be programmed to subscribe to an event bus, message bus, or other programmatic means of detecting requests. Requests can be API calls, system calls, HTTP calls, or other forms of programmatic requests from an application 116 to an operating system, OS service, or endpoint of an external networked service.

At block 412, the process is programmed to execute a decision to allow or deny the request and transmit the local instructions to the particular sidecar process. For example, if the request of block 410 specified port "9090" or port "9091" and the instructions of TABLE were in effect, a data plane sidecar 224 would determine based on a filter configured from the instructions whether to allow or deny the request. At block 414, the process is programmed for the particular sidecar process to execute the local instructions to enforce the security policy for the cloud-native application stack. For example, a request specifying port "9090" or "9091" with filters based on the instructions of TABLE 2 would be blocked or allowed into the network.

At block 416, the process can be programmed to test whether a system restart has occurred. If the result of block 416 is TRUE, YES, or a functional equivalent, then control transfers to block 416 to retransmit the policy data from the global control plane to each of the local control planes. The foregoing steps provide for transmitting the policy data corresponding to the new or updated policy from the global control plane to the first local control plane and the second local control plane without a restart of the first sidecar process or the second sidecar process. The disclosed design also helps to keep the data plane stateless as it can always rely on reconfiguration from the local control plane during policy updates or restarts, and every state update in a stateful policy does not need to trigger a reconfiguration of the sidecar. This has significant advantages for the overall cost, performance, and scalability of the data plane footprint within an operating environment. If the result of block 416 is FALSE, NO, or a functional equivalent, control returns to block 404 to await other input data specifying a new or updated policy.

Referring now to FIG. 4B, in an embodiment, at block 420, a particular local control plane is programmed to discover an activation of a new discoverable protocol in use by a particular microservice. In response, at block 422, the particular local control plane determines a context-specific modification to the policy. At block 424, the particular local control plane is programmed to execute or cause the specific modification to the policy using the particular sidecar process in association with the particular microservice.

FIG. 6 is a flow diagram of a logical process flow that can be programmed for one embodiment. In an embodiment, at block 602, the global control plane is programmed to receive one or more security policies from a management plane. At block 604, the global control plane is programmed to receive application-layer telemetry data from a plurality of the local control planes. At block 606, the global control plane is programmed to compare the local telemetry data to existing security policies and the security policies received from the management plane. As shown in block 608, the comparison can result in identifying one or more security gaps. In response, at block 610, the global control plane is programmed to automatically publish updated security policies to one or more local control planes.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques under program instructions in firmware, memory, other storage, or a combination. To accomplish the described techniques, such computing devices may also combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
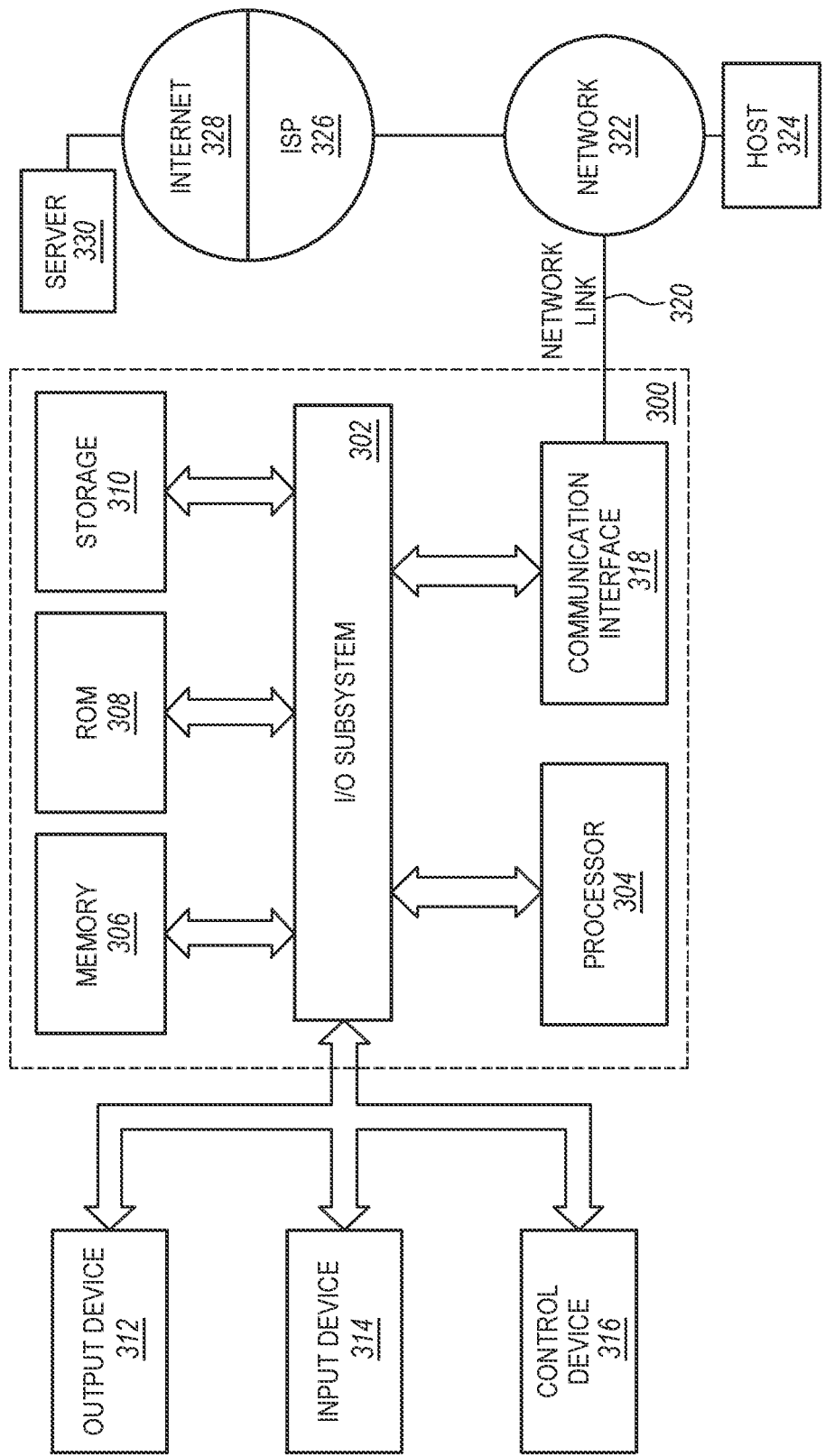
FIG. 3 illustrates a computer system with which one embodiment could be implemented.

FIG. 3 is a block diagram illustrating an example computer system with which an embodiment may be implemented. In the example of FIG. 3, a computer system 300 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or another communication mechanism(s) for communicating information and/or instructions between the components of the computer system 300 over electronic signal paths. The I/O subsystem 302 may include an I/O controller, a memory controller, and at least one I/O port. The electronic signal paths are represented schematically in the drawings, for example, as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU), or a digital signal processor or ARM processor. Processor 304 may comprise an integrated arithmetic logic unit (ALU) or may be coupled to a separate ALU.

Computer system 300 includes one or more units of memory 306, such as the main memory, coupled to I/O subsystem 302 for electronically digitally storing data and instructions to be executed by processor 304. Memory 306 may include volatile memory such as various forms of random-access memory (RAM) or other dynamic storage device. Memory 306 may also be used for storing temporary variables or other intermediate information during the execution of instructions to be executed by processor 304. Such instructions, when stored in non-transitory computer-readable storage media accessible to processor 304, can render computer system 300 into a special-purpose machine customized to perform the operations specified in the instructions.

Computer system 300 includes non-volatile memory such as read-only memory (ROM) 308 or other static storage devices coupled to I/O subsystem 302 for storing information and instructions for processor 304. The ROM 308 may include various forms of programmable ROM (PROM), such as erasable PROM (EPROM) or electrically erasable PROM (EEPROM). A unit of persistent storage 310 may include various forms of non-volatile RAM (NVRAM), such as FLASH memory, solid-state storage, magnetic disk, or optical disks such as CD-ROM or DVD-ROM and may be coupled to I/O subsystem 302 for storing information and instructions. Storage 310 is an example of a non-transitory computer-readable medium that may be used to store instructions and data, which, when executed by processor 304, causes performing computer-implemented methods to execute the techniques herein.

The instructions in memory 306, ROM 308, or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using a structured query language (SQL) or no SQL, an object store, a graph database, a flat file system, or other data storage.

Computer system 300 may be coupled via I/O subsystem 302 to at least one output device 312. In one embodiment, output device 312 is a digital computer display. Examples of a display that may be used in various embodiments include a touchscreen display, a light-emitting diode (LED) display, a liquid crystal display (LCD), or an e-paper display. Computer system 300 may include another type(s) of output device 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections, or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on an output device 312 such as a display. The input device may have at least two degrees of freedom in two axes, a first axis (e.g., x) and a second axis (e.g., y), that allows the device to specify positions in a plane. Another type of input device is a wired, wireless, or optical control device, such as a joystick, wand, console, steering wheel, pedal, gearshift mechanism, or another type of control device. An input device 314 may include a combination of multiple different input devices, such as a video camera and a depth sensor.

In another embodiment, computer system 300 may comprise an Internet of Things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders, and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware, and interfaces for generating position reporting packets, notifications, pulse or heartbeat signals, or other recurring data transmissions that specify a position of the computer system 300, alone or in combination with other application-specific data, directed toward host computer 324 or server computer 330.

Computer system 300 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wires, and fiber optics, including the wires that comprise a bus of I/O subsystem 302. Transmission media can also be acoustic or light waves, such as those generated during radio-wave and infrared data communications.

Various forms of media may carry at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal, and appropriate circuitry can provide the data to I/O subsystem 302, such as placing the data on a bus. I/O subsystem 302 carries the data to memory 306, from which processor 304 retrieves and executes the instructions. The instructions received by memory 306 may optionally be stored on storage 310 before or after execution by processor 304.

Computer system 300 also includes a communication interface 318 coupled to a bus or I/O system 302. Communication interface 318 provides a two-way data communication coupling to network link(s) 320 directly or indirectly connected to at least one communication network, such as network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 322 broadly represents a local area network (LAN), wide-area network (WAN), campus network, internetwork, or any combination thereof. Communication interface 318 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic, or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may connect through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a worldwide packet data communication network represented as Internet 328. A server computer 330 may be coupled to Internet 328. Server computer 330 broadly represents any computer, data center, virtual machine, or virtual computing instance with or without a hypervisor or computer executing a containerized program system such as DOCKER or KUBERNETES. Server computer 330 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 300 and server computer 330 may form elements of a distributed computing system that includes other computers, a processing cluster, a server farm, or other organization of computers that cooperate to perform tasks or execute applications or services. Server computer 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 330 may comprise a web application server that hosts a presentation layer, application layer, and data storage layer, such as a relational database system using a structured query language (SQL) or no SQL, an object store, a graph database, a flat file system, or other data storage.

Computer system 300 can send messages and receive data and instructions, including program code, through the network(s), network link 320, and communication interface 318. In the Internet example, a server computer 330 might transmit a requested code for an application program through Internet 328, ISP 326, local network 322, and communication interface 318. The received code may be executed by processor 304 as it is received and/or stored in storage 310 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A computer system comprising:
    a first computing cluster executing a first plurality of software containers, each software container of the first plurality of software containers hosting a different first application program and a first data plane operating as a first sidecar process in relation to the different first application program, the first computing cluster also executing a first local control plane that is programmatically coupled to the first data plane in each software container of the first plurality of software containers;
    a second computing cluster executing a second plurality of software containers, each software container of the second plurality of software containers hosting a different second application program and a second data plane operating as a second sidecar process in relation to the different second application program, the second computing cluster also executing a second local control plane that is programmatically coupled to the second data plane in each software container of the second plurality of software containers;
    a global control plane that is programmatically coupled with the first local control plane and the second local control plane;
    one or more non-transitory computer-readable storage media storing one or more sequences of instructions which, when executed using one or more processors of the first computing cluster, the second computing cluster, and the global control plane, cause the one or more processors to execute:
        initiating execution of the global control plane, the first local control plane, and the second local control plane;
        receiving, using the global control plane, input data specifying a new or updated policy;
        transmitting policy data corresponding to the new or updated policy from the global control plane to the first local control plane and the second local control plane;
        at the first local control plane, transforming the policy data into local filters or instructions for the first sidecar process;
        receiving, at the first local control plane, from the first sidecar process, a request associated with a particular first application program;
        executing a decision to allow or deny the request and transmitting the local filters or instructions to the first sidecar process;
        executing the local filters or instructions using the first sidecar process to enforce the new or updated policy against the particular first application program;
        discovering, at the first local control plane, an activation of a new discoverable protocol in use by a first microservice application;
        determining, at the first local control plane, a context-specific modification to the new or updated policy based on the new discoverable protocol; and
        executing the context-specific modification to the new or updated policy using the first sidecar process in association only with the first microservice application.

2. The computer system of claim 1, wherein each software container of the first plurality of software containers hosts a different first microservice, and each software container of the second plurality of software containers hosts a different second microservice.

3. The computer system of claim 1, wherein each of the first computing cluster and the second computing cluster is any of an AWS KUBERNETES cluster, an AZURE KUBERNETES cluster, and a GCP KUBERNETES cluster.

4. The computer system of claim 1, further comprising instructions which, when executed using the one or more processors of the first computing cluster, the second computing cluster, and the global control plane, cause the one or more processors to execute transmitting the policy data corresponding to the new or updated policy from the global control plane to the first local control plane and the second local control plane without a restart of the first sidecar process or the second sidecar process.

5. The computer system of claim 1, further comprising:
    receiving, at the global control plane, one or more security policies from a management plane;
    receiving, at the global control plane, application-layer telemetry data from the first local control plane and the second local control plane;
    comparing the application-layer telemetry data to existing security policies and the new or updated policy received from the management plane;
    identifying one or more security gaps based on the comparing; and
    automatically publishing updated security policies to one or more of the first local control plane and the second local control plane based on the one or more security gaps that were identified.

6. A computer-implemented method of executing a global control of a cloud-native application stack in a distributed computer system, the computer-implemented method comprising:
    in a first computing cluster executing a first plurality of software containers, each software container of the first plurality of software containers hosting a different first application program, initiating execution of a first data plane operating as a first sidecar process in relation to the different first application program, the first computing cluster also executing a first local control plane that is programmatically coupled to the first data plane in each software container of the first plurality of software containers;
    in a second computing cluster executing a second plurality of software containers, each software container of the second plurality of software containers hosting a different second application program, initiating execution of a second data plane operating as a second sidecar process in relation to the different second application program, the second computing cluster also executing a second local control plane that is programmatically coupled to the second data plane in each software container of the second plurality of software containers;

initiating execution of a global control plane that is programmatically coupled with the first local control plane and the second local control plane;

receiving, using the global control plane, input data specifying a new or updated policy;

transmitting policy data corresponding to the new or updated policy from the global control plane to the first local control plane and the second local control plane;

at the first local control plane, transforming the policy data into local filters or instructions for the first sidecar process;

receiving, at the first local control plane, from the first sidecar process, a request associated with a particular first application program;

executing a decision to allow or deny the request and transmitting the local filters or instructions to the first sidecar process;

executing the local filters or instructions using the first sidecar process to enforce the new or updated policy against the particular first application program;

discovering, at the first local control plane, an activation of a new discoverable protocol in use by a particular microservice application;

determining, at the first local control plane, a context-specific modification to the new or updated policy based on the new discoverable protocol; and executing the context-specific modification to the new or updated policy using the first sidecar process in association only with the particular microservice application.

7. The computer-implemented method of claim 6, wherein each software container of the first plurality of software containers hosts a different first microservice, and each software container of the second plurality of software containers hosts a different second microservice.

8. The computer-implemented method of claim 6, wherein each of the first computing cluster and the second computing cluster is any of an AWS KUBERNETES cluster, an AZURE KUBERNETES cluster, and a GCP KUBERNETES cluster.

9. The computer-implemented method of claim 6 further comprising transmitting the policy data corresponding to the new or updated policy from the global control plane to the first local control plane and the second local control plane without a restart of the first sidecar process or the second sidecar process.

10. The computer-implemented method of claim 6, further comprising:
receiving, at the global control plane, one or more security policies from a management plane;
receiving, at the global control plane, application-layer telemetry data from the first local control plane and the second local control plane;
comparing the application-layer telemetry data to existing security policies and the new or updated policy received from the management plane;
identifying one or more security gaps based on the comparing; and
automatically publishing updated security policies to one or more of the first local control plane and the second local control plane based on the one or more security gaps that were identified.

11. One or more non-transitory computer-readable storage media storing one or more sequences of instructions which, when executed using one or more processors associated with a cloud-native application stack in a distributed computer system, cause the one or more processors to execute:

in a first computing cluster executing a first plurality of software containers, each software container of the first plurality of software containers hosting a different first application program, initiating execution of a first data plane operating as a first sidecar process in relation to the different first application program, the first computing cluster also executing a first local control plane that is programmatically coupled to the first data plane in each software container of the first plurality of software containers;

in a second computing cluster executing a second plurality of software containers, each software container of the second plurality of software containers hosting a different second application program, initiating execution of a second data plane operating as a second sidecar process in relation to the different second application program, the second computing cluster also executing a second local control plane that is programmatically coupled to the second data plane in each software container of the second plurality of software containers;

initiating execution of a global control plane that is programmatically coupled with the first local control plane and the second local control plane;

receiving, using the global control plane, input data specifying a new or updated policy;

transmitting policy data corresponding to the new or updated policy from the global control plane to the first local control plane and the second local control plane;

at the first local control plane, transforming the policy data into local filters or instructions for the first sidecar process;

receiving, at the first local control plane, from the first sidecar process, a request associated with a particular first application program;

executing a decision to allow or deny the request and transmitting the local filters or instructions to the first sidecar process;

executing the local filters or instructions using the first sidecar process to enforce the new or updated policy against the particular first application program;

discovering, at the first local control plane, an activation of a new discoverable protocol in use by a particular microservice application;

determining, at the first local control plane, a context-specific modification to the new or updated policy based on the new discoverable protocol; and executing the context-specific modification to the new or updated policy using the first sidecar process in association only with the particular microservice application.

12. The one or more non-transitory computer-readable storage media of claim 11, wherein each software container of the first plurality of software containers hosts a different first microservice, and each software container of the second plurality of software containers hosts a different second microservice.

13. The one or more non-transitory computer-readable storage media of claim 11, wherein each of the first computing cluster and the second computing cluster is any of an AWS KUBERNETES cluster, an AZURE KUBERNETES cluster, and a GCP KUBERNETES cluster.

14. The one or more non-transitory computer-readable storage media of claim 11 further comprising sequences of instructions which, when executed using the one or more processors, cause the one or more processors to execute transmitting the policy data corresponding to the new or updated policy from the global control plane to the first local control plane and the second local control plane without a restart of the first sidecar process or the second sidecar process.

15. The one or more non-transitory computer-readable storage media of claim 11, further comprising sequences of instructions which, when executed using the one or more processors, cause the one or more processors to execute:
   receiving, at the global control plane, one or more security policies from a management plane;
   receiving, at the global control plane, application-layer telemetry data from the first local control plane and the second local control plane;
   comparing the application-layer telemetry data to existing security policies and the new or updated policy received from the management plane;
   identifying one or more security gaps based on the comparing; and
   automatically publishing updated security policies to one or more of the first local control plane and the second local control plane based on the one or more security gaps that were identified.

\* \* \* \* \*